US009642010B2

(12) United States Patent
Motodate et al.

(10) Patent No.: US 9,642,010 B2
(45) Date of Patent: May 2, 2017

(54) MANAGEMENT SERVER, DATA PROCESSING METHOD, AND PROGRAM

(71) Applicant: FeliCa Networks, Inc., Tokyo (JP)

(72) Inventors: Kenichi Motodate, Kanagawa (JP);
Keitarou Watanabe, Tokyo (JP);
Junichi Oki, Tokyo (JP)

(73) Assignee: FeliCa Networks, Inc., Tokyo (JP)

( * ) Notice: Subject to any disclaimer, the term of this patent is extended or adjusted under 35 U.S.C. 154(b) by 0 days.

(21) Appl. No.: 14/636,492

(22) Filed: Mar. 3, 2015

(65) Prior Publication Data
US 2015/0281965 A1 Oct. 1, 2015

(30) Foreign Application Priority Data

Mar. 31, 2014 (JP) ................. 2014-071322

(51) Int. Cl.
| | |
|---|---|
| *H04M 1/66* | (2006.01) |
| *H04W 12/08* | (2009.01) |
| *H04B 1/3816* | (2015.01) |
| *G06F 21/62* | (2013.01) |
| *H04W 4/00* | (2009.01) |

(52) U.S. Cl.
CPC ........... *H04W 12/08* (2013.01); *G06F 21/62* (2013.01); *H04B 1/3816* (2013.01); *H04W 4/008* (2013.01)

(58) Field of Classification Search
CPC ....... H04W 4/02; H04W 4/021; H04W 4/028; H04W 36/0083; H04W 48/18; H04W 4/005; H04W 72/1263; H04W 76/025; H04W 8/005; H04W 68/12; H04W 88/16; H04W 8/02; H04W 8/18; H04W 8/24; H04L 65/60; H04L 65/407; H04L 2209/24; H04L 9/3247; H04L 2209/38; H04L 63/0428; H04L 63/0869; H04L 9/085; H04L 9/0861; H04L 9/088; H04L 9/0894; H04L 9/16; H04L 29/06047; H04L 63/08; H04L 63/062; H04L 63/083
See application file for complete search history.

(56) References Cited

U.S. PATENT DOCUMENTS

| | | | |
|---|---|---|---|
| 2005/0182926 A1* | 8/2005 | Akashika | .............. G06F 21/606 713/159 |
| 2007/0223696 A1* | 9/2007 | Furuyama | ............ G06K 19/073 380/239 |

(Continued)

*Primary Examiner* — Nimesh Patel
(74) *Attorney, Agent, or Firm* — Paratus Law Group, PLLC

(57) ABSTRACT

There is provided a management server including a communication unit configured to communicate with a communication terminal that utilizes a service, and a data processing unit. The data processing unit is configured to receive, from the communication terminal, system configuration information including a memory system configuration of the communication terminal, determine, in accordance with the system configuration information, a memory area in the communication terminal where service data for the communication terminal to utilize the service is recorded or a memory area in the communication terminal from which the service data is read, generate a command to execute a process to access the memory area or service data to be recorded in the memory area, and transmit the command or the service data to the communication terminal via the communication unit.

11 Claims, 9 Drawing Sheets

(56) References Cited

U.S. PATENT DOCUMENTS

| | | | |
|---|---|---|---|
| 2010/0082397 A1* | 4/2010 | Blegen | G06Q 30/02 |
| | | | 705/14.58 |
| 2011/0145514 A1* | 6/2011 | Lee | G06F 9/544 |
| | | | 711/147 |
| 2012/0083296 A1* | 4/2012 | Zhou | H04W 4/12 |
| | | | 455/466 |
| 2012/0149302 A1* | 6/2012 | Sekiya | G06Q 20/3278 |
| | | | 455/41.1 |

* cited by examiner

FIG.4

| (A) TERMINAL KIND | (B) SECURE ELEMENT CONFIGURATION | | (C) PROCESS |
|---|---|---|---|
| | (B1) SECURE ELEMENT OF EMBEDDED TYPE (eSE) | (B2) SECURE ELEMENT OF REMOVABLE TYPE (UICC) | |
| (TERMINAL 1) | O | O | UTILIZE eSE OR UICC |
| (TERMINAL 2) | O | — | UTILIZE eSE |
| (TERMINAL 3) | — | O | UTILIZE UICC |
| (TERMINAL 4) | — | — | UTILIZE OTHER MEMORY |

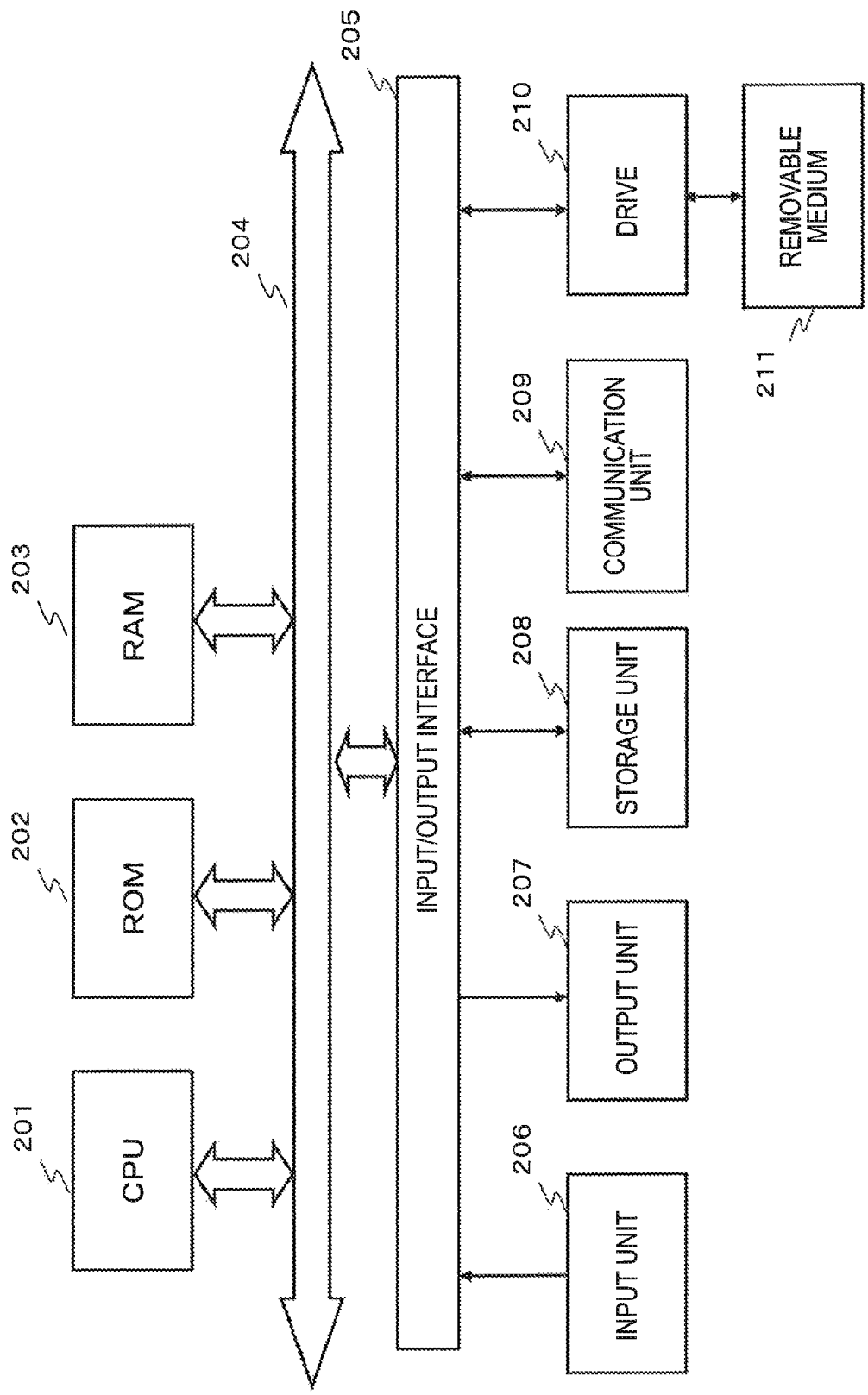

MANAGEMENT SERVER, DATA PROCESSING METHOD, AND PROGRAM

CROSS REFERENCE TO RELATED APPLICATIONS

This application claims the benefit of Japanese Priority Patent Application JP 2014-071322 filed Mar. 31, 2014, the entire contents of which are incorporated herein by reference.

BACKGROUND

Embodiments of the present disclosure relate to a management server, a data processing method, and a program. More particularly, the embodiments of the present disclosure relate to a management server, a data processing method, and a program which are configured to provide services corresponding to a function of a user's communication terminal.

Recently, use of a communication terminal such as a smartphone and the like has become popular, and a variety of services are implemented through the use of the communication terminal.

However, many different types of communication terminals with multiple functions are present and utilized by users.

For example, terminals with a near field communication (NFC) feature and terminals without NFC coexist.

In addition, there are terminals which have a secure memory system that provides a secure area in a memory of a communication terminal or in an external memory detachable to a communication terminal to execute processing according to a specific algorithm to write or read data, and terminals which do not have the secure memory system.

In addition, secure memory systems have various types, and memory access processing is performed according to algorithms which differ depending on a type.

Note that related art which discloses processing or a system configuration of a communication terminal includes JP 2013-257632, for example.

SUMMARY

When system configurations of communication terminals utilized by users differ, in some cases, processing on the side that provides services for the communication terminals has to be changed depending on the system configurations of the communication terminals.

More specifically, it may be necessary to execute a process to confirm a system configuration of a communication terminal and provide services after the confirmation, which increases a burden on a service provider.

The present disclosure has been made in light of such a problem, for example, and it is desirable to provide a management server, and a data processing method, and a program that enable a service provider to provide services without executing a process to confirm functions of a terminal utilized by users, and the like.

According to a first aspect of the present disclosure, there is provided a device which includes a management server including a communication unit configured to communicate with a communication terminal that utilizes a service, and a data processing unit. The data processing unit is configured to receive, from the communication terminal, system configuration information including a memory system configuration of the communication terminal, determine, in accordance with the system configuration information, a memory area in the communication terminal where service data for the communication terminal to utilize the service is recorded or a memory area in the communication terminal from which the service data is read, generate a command to execute a process to access the memory area or service data to be recorded in the memory area, and transmit the command or the service data to the communication terminal via the communication unit.

According to the management server of an embodiment of the present disclosure, the data processing unit has priority order information indicating a memory area processing on which takes precedence when the communication terminal has a plurality of process target memory areas, and is configured to make the determination based on the system configuration information and the priority order information.

According to the management server of an embodiment of the present disclosure, the communication unit further communicates with a service providing server related to the service, and the data processing unit acquires the priority order information from the service providing server via the communication unit.

According to the management server of an embodiment of the present disclosure, the memory system configuration is a system configuration of a secure element of embedded type and/or a secure element of removable type, and the priority order information indicates a priority order of an access process to the secure element of embedded type and/or the secure element of removable type.

According to the management server of an embodiment of the present disclosure, the priority order information indicates that the access process is executed on both secure elements when the communication terminal has both the secure element of embedded type and the secure element of removable type.

According to the management server of an embodiment of the present disclosure, the memory system configuration is a system configuration including presence or absence of a secure element, and the data processing unit creates service data to be recorded in an insecure memory area when the communication terminal has no secure element, and transmits the service data to the communication terminal via the communication unit.

According to the management server of an embodiment of the present disclosure, the service data to be recorded in the insecure memory area is a two-dimensional barcode.

According to the management server of an embodiment of the present disclosure, the communication unit is further configured to communicate with the service providing server related to the service, and the data processing unit is configured to acquire from the service providing server, via the communication unit, request mode information which indicates content of a process that the communication terminal requests of the service providing server, and generate the command or the service data based on the request mode information and the system configuration information.

According to a second aspect of the present disclosure, there is provided a data processing method including acquiring system configuration information including a memory system configuration of a communication terminal and transmitting the system configuration information to a management server, receiving a command to execute a process to access a memory area in the communication terminal based on the system configuration information, and causing the command to be executed on the memory area in the communication terminal.

According to the data processing method of an embodiment of the present disclosure, the memory system configuration is a system configuration of a secure element of embedded type and a secure element of removable type.

According to a third aspect of the present disclosure, there is provided a program for causing data processing to be executed in a communication terminal. The communication terminal has a communication unit, a storage unit configured to store data received through the communication unit, and a data processing unit configured to execute a data record process or a data read process on the storage unit. The program causes the data processing unit to acquire system configuration information of the communication terminal including a memory system configuration of a secure memory included as the storage unit, transmit the system configuration information to outside of the communication terminal via the communication unit, and execute a command, received via the communication unit, to execute a process to access the secure memory from the outside of the communication terminal.

According to the program of an embodiment of the present disclosure, the memory system configuration is a system configuration of a secure element of embedded type and a secure element of removable type.

Note that the program according to the present disclosure is a program that can be provided in a storage medium or communication medium that is provided in a 26 computer-readable form for an information processing device or a computer system that is capable of executing various types of program code, for example. Providing this sort of program in a computer-readable form makes it possible to implement the processing according to the program in the information processing device or the computer system.

The purpose, features, and advantages of the present disclosure will be made clear later by a more detailed explanation that is based on the embodiments of the present disclosure and the appended drawings. Furthermore, the system in this specification is not limited to being a configuration that logically aggregates a plurality of devices, all of which are contained within the same housing.

According to a configuration of an example of the present disclosure, an operator that provides services no longer has to be aware of a system configuration of a user's communication terminal and determine on a memory area in which data is written or read and on data that is to be written or read. Thus, a configuration is implemented that may execute a process to access a memory of a user's communication terminal which has a different system configuration, without increasing a load on a service providing server.

Note that the effects described herein are only exemplary and not to be limited and that there may be additional effects.

BRIEF DESCRIPTION OF THE DRAWINGS

FIG. 4 is a view showing a list of communication terminals by a system configuration;

FIG. 9 is a view illustrating a hardware configuration example of a management server 40.

DETAILED DESCRIPTION OF THE EMBODIMENT(S)

Figure 1:
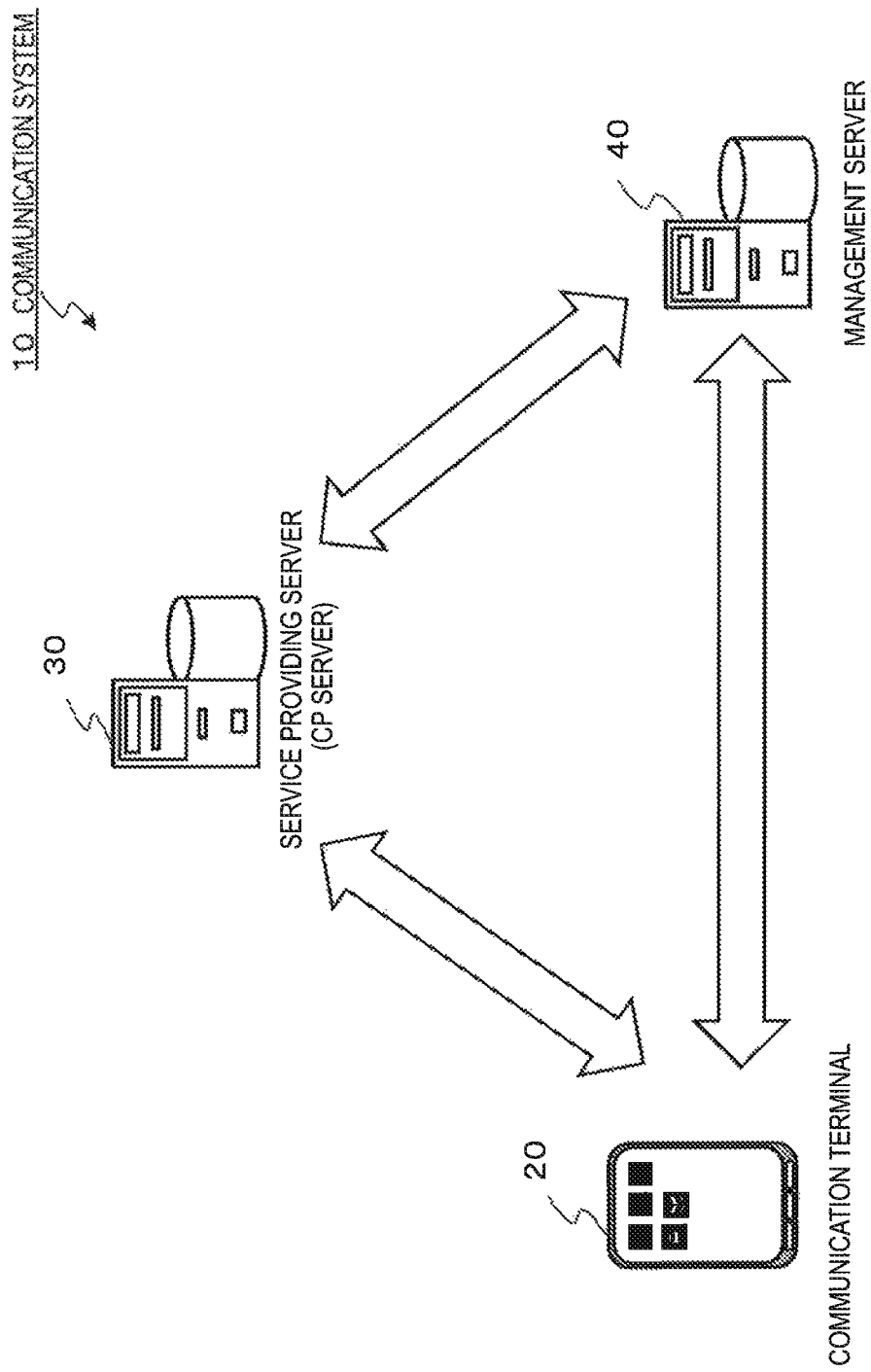
FIG. 1 is a view illustrating a configuration example of a communication system.

Details of a management server, and a data processing method, and a program according to an embodiment of the present disclosure will be described hereinafter with reference to the drawings. Note that a description will be provided according to the following items.
1. Regarding a configuration example of a communication system
2. Regarding a data record configuration which utilizes a secure memory of a communication terminal
3. Sequence of a process to acquire system configuration information of a communication terminal and a process to execute a command corresponding to a system configuration of the communication terminal
4. Regarding a hardware configuration example of a communication terminal
5. Regarding a hardware configuration example of a management server
6. Summary of the present disclosure
<1. Regarding a Configuration Example of a Communication System>

FIG. 1 is a view illustrating a configuration example of a communication system which performs communication processing to which an embodiment of the disclosure is applied.

As illustrated in FIG. 1, a communication system 10 has a communication terminal 20, which is a user terminal; a service providing server (Contents Provider server) 30 which is a main service entity providing the communication terminal 20 with service data such as a product discount coupon, for example; and further a management server 40 which executes a process to generate data for secure memory access corresponding to a system configuration of a communication terminal or data for memory access to a communication terminal without a secure memory, and the like.

The service providing server 30 which is a main service entity to provide service data is a server whose operation, commissioning of the operation, or provision of service is commissioned to a third party by a restaurant or a coffee shop, for example.

Processes that the service providing server 30 attempts to execute include a process to record in the communication terminal 20 service data such as a product discount coupon, for example or a process to read the service data recorded in the communication terminal 20 and provide service corresponding to the read service data, and the like.

The communication terminal 20 executes a process to write service data such as a coupon, for example, in a memory. The communication terminal 20 further executes a process to cause a reader/writer and the like to read the service data written in the memory through the near field communications by holding the service data over the reader/writer and the like or a process to display information (coupon information or a two-dimensional barcode, for example) related to the service data on the screen, and the like.

However, system configurations of the communication terminal 20 are varied, and different functions are mixed. Specifically, there are terminals which have a secure memory area to write service data such as a coupon and are configured to write data according to a specific algorithm or terminals which do not have a secure memory. In addition, there are many different types of terminals which have the secure memory, such as a case in which a terminal securely manages a memory area in a control unit of a communication terminal such as an application processor, and the like, a case in which a terminal has a tamper-resistant secure chip, a case in which a terminal has a secure memory area in a removable memory card or a SIM card, and the like. In addition, depending on service that the service provider intends to provide, there may be some other information that the service provider is desirable to have, such as an OS of the communication terminal 20 or screen size and the like, in addition to a system configuration related to the memory.

The service providing server 30 has to determine a system configuration of the communication terminal 20 and provide the communication terminal 20 with service data by processing corresponding to a determination result. In the past, information necessary for providing services could be obtained to some extent by a server acquiring identification information of the communication terminal 20. However, in the situation in which types of the communication terminals 20 increase, the processing is a big burden on the service providing server 30. In addition, for any service to be provided based on recording or writing to a secure memory area, in particular, it may not be possible to determine only with the identification information whether or not a user has prepared a removable memory area in the communication terminal 20. Furthermore, in that case, it may also become necessary to determine whether or not the communication terminal 20 can respond to an algorithm corresponding to service, even if the communication terminal 20 has a secure memory area.

In processing of an embodiment of the disclosure, service data may be provided to a user's communication terminal without creating such a burden on the service providing server 30. In addition, the processing may also be applicable to a case in which service data recorded in the communication terminal 20 is read rather than being provided, when the service is utilized.

<2. Regarding a Data Record Configuration which Utilizes a Secure Memory of a Communication Terminal>

Figure 2:
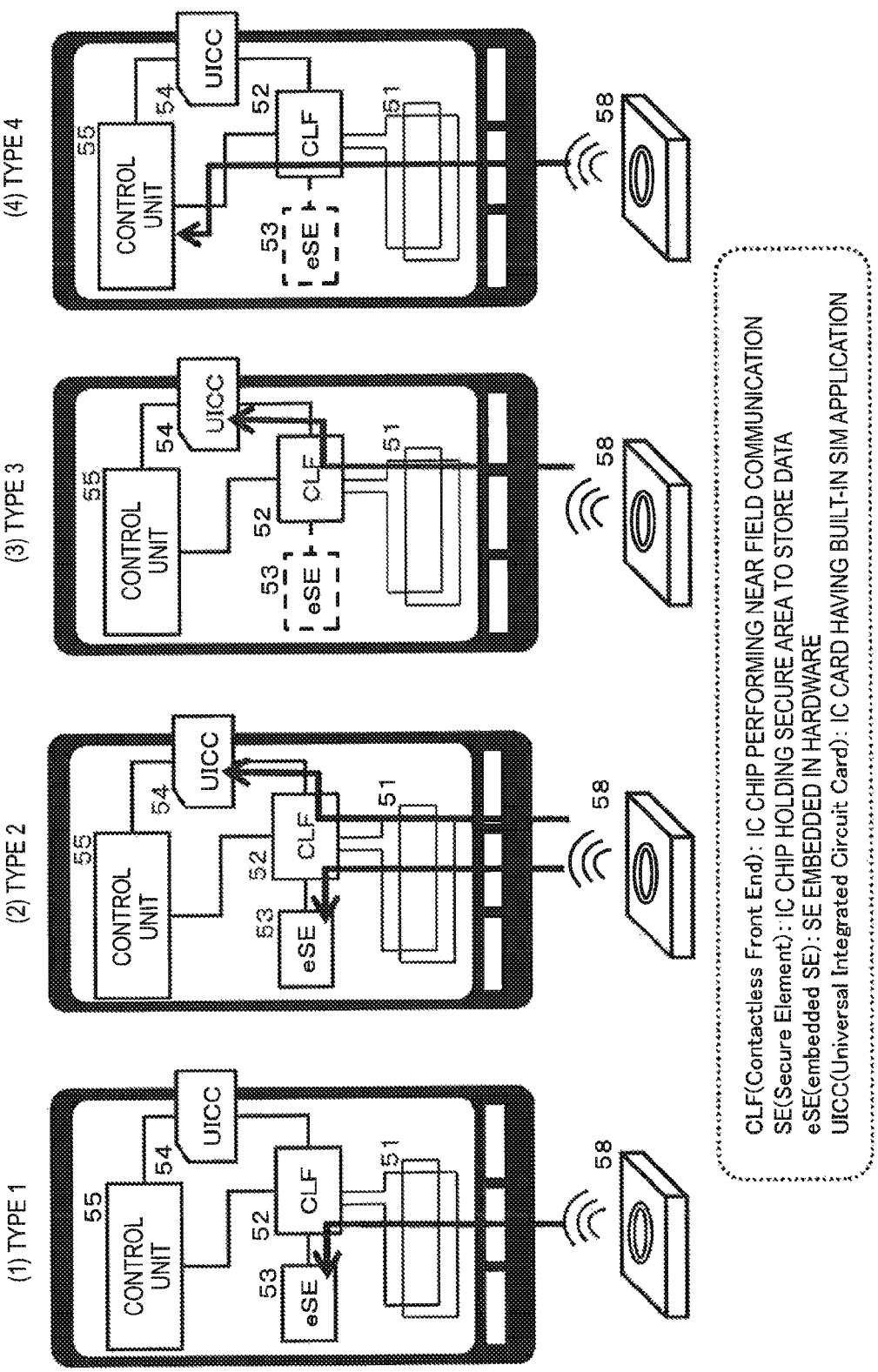
FIG. 2 is a view illustrating a system configuration example of a communication terminal 20.

FIG. 2 is a view illustrating processing examples in communication terminals with different system configurations when service data such as a coupon, for example, is stored in various types of memory areas and an external reader/writer accesses the memory areas to read the service data.

While a communication terminal has a storage unit to store data, the communication terminal may have a secure memory area free access to which is prohibited, as a configuration of the storage unit.

A secure memory is a memory area access to which is allowed through the utilization of processing according to an algorithm run by a specific program or of specific key information and the like. For example, the secure memory is utilized as a memory area for a wide range of service data such as the coupon mentioned above.

FIG. 2 is a view illustrating the processing example in the communication terminals with different system configurations when service data recorded in a secure memory is read through a reader/writer 58.

FIG. 2 illustrates four types (types 1 to 4) of processing examples.

Components of each type of the communication terminals of will be described.

The communication terminal has some or all of an antenna 51 configured to transmit and receive data to and from the reader/writer 58, a contactless front end (CLF) 52, an embedded secure element 53 (eSE), a universal integrated circuit card (UICC) 54, and a control unit 55.

The CLF 52 is an IC chip configured to perform near field communications and executes a communication process with the reader/writer 58.

The eSE 53 is an IC chip configured as a secure element that has a secure memory of an embedded type and a memory control unit.

Note that the eSE 53 is of the embedded type and often not configured to be removable, unlike the UICC 54 of a card type.

The UICC 54 is an IC chip including a subscriber identity module card (SIM) that has a unique ID such as a telephone number, or a memory area and an execution function for a SIM application which executes a process to use a unique ID. The UICC 54 has a configuration of a removable card type, for example. In addition, in some cases, service data may be recorded in a memory card, not shown, which is also removable similar to the UICC 54.

The control unit 55 is an IC chip configured to perform data processing or communication control of a mobile phone and includes an application processor or a baseband processor. Here, a part of a memory area in the control unit, which is not shown, can be treated as a secure memory. In addition, the CLF 52 may be included in the control unit 55.

A secure memory may be configured in any of the eSE 53, the UICC 54, the control unit 55, and the memory area in the memory card, which is not shown. There are various utilization forms depending on which secure memory is used to write or read data. In addition, while the example of recording service data in the secure memory is used for the purpose of illustration, service data may not be necessarily recorded in a secure memory area depending on content of the service data provided by a service provider.

FIG. 2 shows the following four memory utilization types:

(1) Type 1: Type to utilize the eSE 53 to write or read service data (2) Type 2: Type to selectively utilize the eSE 53 or the UICC 54 to write or read service data (3) Type 3: Type to utilize the UICC 54 to write or read service data (4) Type 4: Type to utilize the memory area of the control unit 55 to write or read service data Note that in some specifications, secure data communications with a reader/writer are implemented through proximity communications utilizing near field communication (NFC) as a method for executing a process to access a secure memory.

The NFC includes different types of communication methods such as NFC-A, NFC-B and NFC-F, each having specifications to perform processing according to a different protocol.

The NFC-A, the NFC-B, and the NFC-F are simply different in a communication method, which is independent of which of the eSE 53, the UICC 54, the control 55, the memory card not shown, and the memory area in the control unit is utilized. A memory area to be used depends on a memory system configuration of the communication terminal 20 or a service related application. Note that a communication method to be used when performing proximity communications is determined based on an application.

Note that for (1) Type 1 in FIG. 2, for example, only an application which utilizes the eSE 53 is present in the communication terminal 20. In (2) Type in FIG. 2, a plurality of applications which utilize each of the eSE 53 and the UICC 54 are present in the communication terminal 2. In the system configurations in (3) Type 3 and (4) Type 4 in FIG. 2, the communication terminal 20 does not have the eSE 53. In (3) Type 3 in FIG. 2, only an application which utilizes the UICC 54 is present in the communication terminal 20. In (4) Type 4 in FIG. 2, only an application which utilizes the memory area of the control unit 55 is present in the communication terminal 20.

When the communication terminals 20 with different memory system configurations receive service data such as a coupon to be transmitted from the service provider, the service data is transmitted after the memory area in which the service data is recorded is determined. In addition, in some cases, depending on which secure memory is utilized to record or read service data, an algorithm to be executed varies or a necessary parameter or key and the like may also differ.

Figure 3:
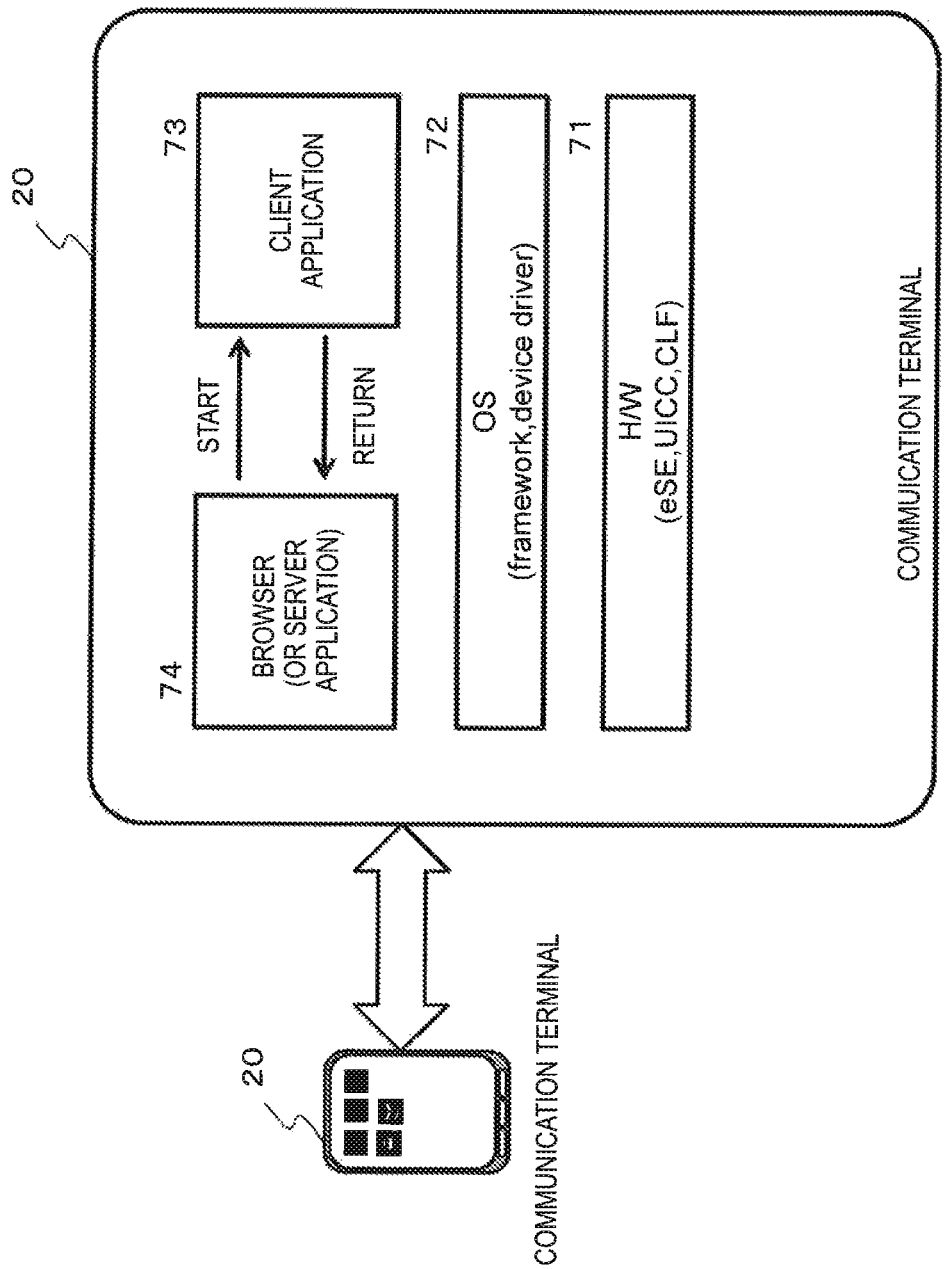
FIG. 3 is a view illustrating a system configuration example of the communication terminal 20.

FIG. 3 is a view illustrating a layer configuration of a function to be used in the communication terminal 20 to record data in a secure memory or read data from the secure memory.

The lowermost layer is a hardware (H/W) layer 74.

The hardware (H/W) layer 74 includes the secure memory illustrated with reference to FIG. 2 and a secure memory access execution unit and the like.

More specifically, the hardware (H/W) layer 74 includes a secure data process execution unit configured to execute a process according to a specific algorithm, or record or read data in or from a secure memory through a process to apply a specific key and the like, and a secure memory which is a storage unit configured to store secure data such as service data provided from an external server and the like, authentication ID, key information to apply to an authentication process, and the like.

An OS layer 72 is present as an upper layer of the hardware layer 74. The OS layer 72 is an operation system, such as a framework, a device driver and the like, configured to control basic processes in execution of data processing in a communication terminal.

An application layer including applications configured to perform a wide range of specific data processing is set as an upper layer of the OS layer 72.

The example illustrated in the figure shows a client application 73 and a browser 71 as an application included in the application layer.

The browser 71 is a program to browse a Web page (site) provided by an external server, for example.

Note that a configuration may be such that an application provided by an external server (external service providing server application) is executed to browse a Web page (site) provided by the external server, in place of the browser 71.

A start process is executed by the browser 71 on the client application 73, which is an application to execute data processing involving access to the secure memory. For example, the client application 73 is started through a touch process of the application start icon on a display screen displayed by the browser. When processing by the client application ends, the process returns to the browser 71.

Note that a specific processing sequence will be described below with reference to FIG. 5 onwards.

The communication terminal 20 has the function and configuration illustrated in FIG. 3, for example.

Note that as described above with reference to FIG. 2, the memory system configuration varies in each of the communication terminals 20.

FIG. 4 is a list that classifies configurations of secure memories in the existing communication terminal 20 and examples of utilization. For simplicity of description, memory areas to be utilized are classified to a secure element of embedded type, a secure element of removable type, and a case that has neither the secure element of embedded type nor the secure element of removable type. For example, a memory area of the eSE 53 or the control unit 55 can be classified to the embedded type, while a memory area of the UICC 54 or the memory card, not shown, can be classified to the removable type.

FIG. 4 lists each correspondence relation as follows:
(A) Terminal type
(B) Secure element configuration
(C) Processing
As (B) Secure element configuration, the list indicates:
(B1) Secure element of embedded type (eSE); and
(B2) Secure element of removable type (UICC).

The list indicates whether or not the two secure elements are present. A circle mark represents an element that a terminal is provided with.

Specifically, (Terminal 1) is a terminal that has both (B1) Secure element of embedded type (eSE) and (B2) Secure element of removable type (UICC).

(Terminal 2) is a terminal that has only (B1) Secure element of embedded type (eSE).

(Terminal 3) is a terminal that has only (B2) Secure element of removable type (UICC).

(Terminal 4) is a terminal that has neither (B1) Secure element of embedded type (eSE) nor (B2) Secure element of removable type (UICC).

At present, communication terminals that have the various system configurations are mixed on the market.

A process to record or read service data in a secure memory is executed as a different process in each terminal of (Terminal 1) to (Terminal 4).

The terminal 1 that has both (B1) Secure element of embedded type (eSE) and (B2) Secure element of removable type (UICC) selectively utilizes either the secure element of embedded type (eSE) or the secure element of removable type (UICC) to execute the record process and the read process of the service data.

The terminal 2 that has only (B1) Secure element of embedded type (eSE) utilizes the secure element of embedded type to execute the record process and the read process of the service data.

The terminal 3 that has only (B2) Secure element of removable type (UICC) utilizes the secure element of removable type to execute the record process and the read process of the service data.

The terminal 4 that has neither (B1) Secure element of embedded type (eSE) nor (B2) Secure element of removable type (UICC) utilizes other memory to execute the record process and the read process of the service data. Alternatively, there may be such a configuration that the record process and the read process of the service data are not executed.

In this manner, execution forms of the record process and read process of the service data differ depending on a system configuration of a communication terminal. Here, the description was provided with the service utilizing the secure memory area as an example. Even in the case of service for which a secure memory area is not necessary, it is desirable to determine a memory area to store service data depending on a memory system configuration of a communication terminal. In that case, it is determined whether service data is stored in a memory of embedded type (memory built in a communication terminal) or a memory of removable type (memory that a user may easily remove from a communication terminal).

<3. Sequence of a Process to Acquire System Configuration Information of a Communication Terminal and a Process to Execute a Command Corresponding to a System Configuration of the Communication Terminal>

As described with reference to FIG. 4, the memory system configurations of the communication terminals vary. When an attempt is made to record service data such as a coupon, for example, in a secure memory of a communication terminal is made, processing corresponding to a system configuration of a terminal to which data is provided is necessary.

A service providing server 20 individually determines a system configuration or a function of a communication terminal and selects and executes a different processing algorithm depending on a determination result, which increases a burden on the service providing server 20 and also contributes to a delay caused in processing.

An example that solves the problem and alleviates a burden of a service providing server will be described hereinafter.

Specifically, a process to acquire system configuration information of a communication terminal, and to cause a management server to generate a command corresponding to the system configuration and the communication terminal to execute the command will be described. What the management server generates is not limited to the command, and the management server may generate data to be processed on the side of the communication terminal and the communication terminal may execute data processing.

The processing sequence of the example will be described with reference to the sequence diagrams illustrated in FIG. 5 and FIG. 6.

Figure 5:
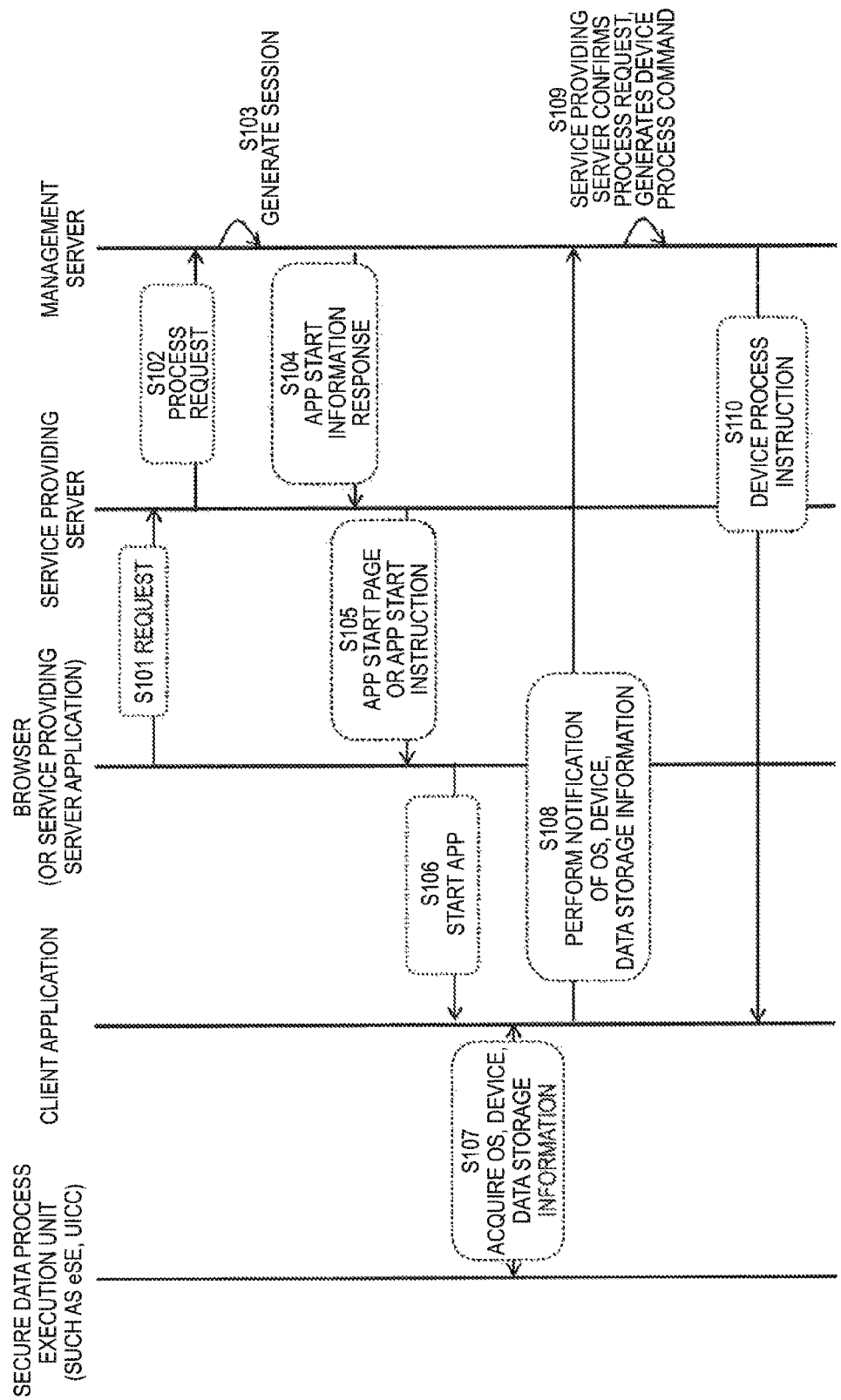
FIG. 5 is a view illustrating a sequence of a process to acquire system configuration information of a communication terminal and a process to execute a command corresponding to the system configuration of the communication terminal.
Figure 6:
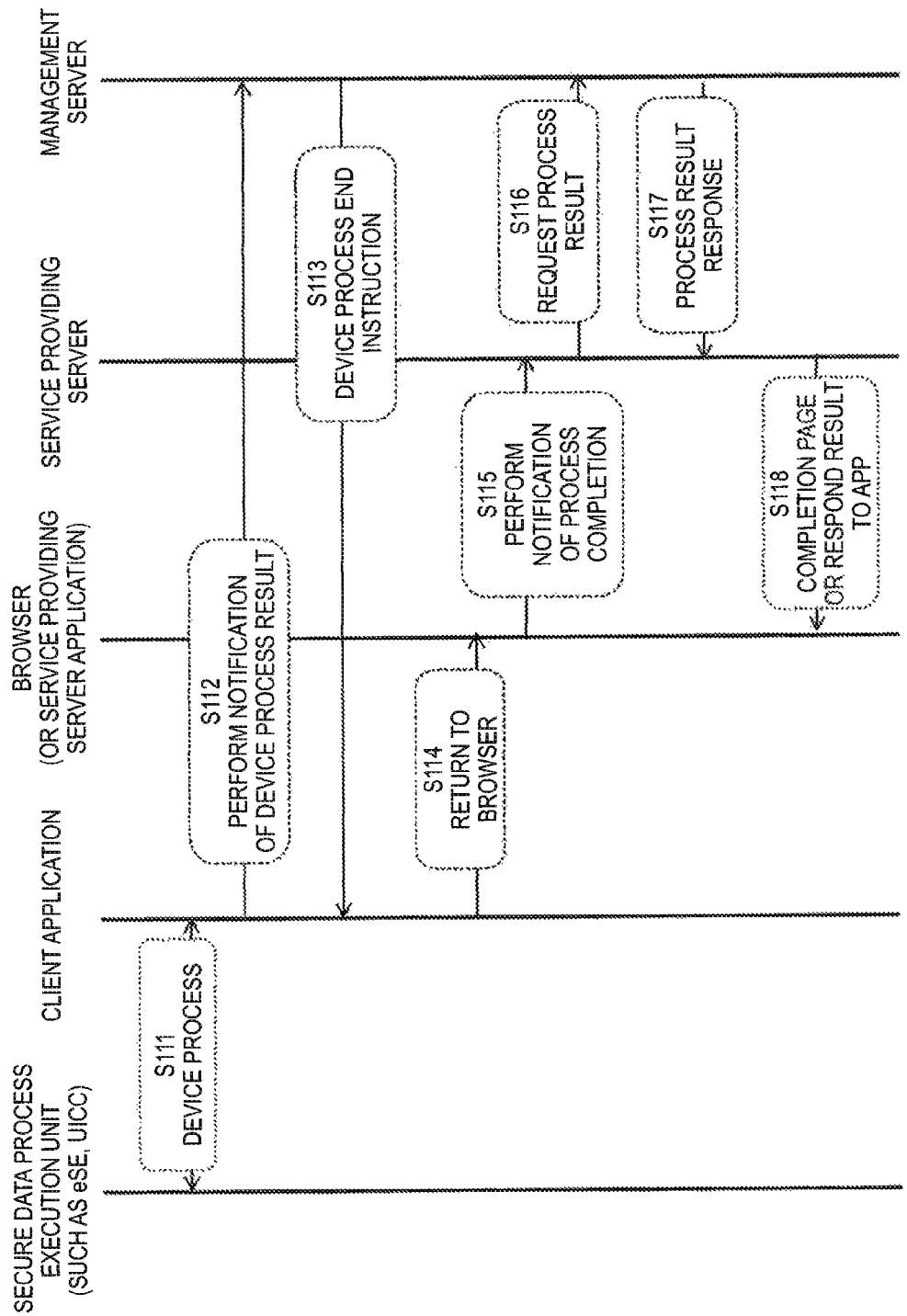
FIG. 6 is a view illustrating the sequence of the process to acquire the system configuration information of the communication terminal and the process to execute the command corresponding to the system configuration of the communication terminal.

FIG. 5 and FIG. 6 illustrate each configuration shown below, from the left:

(1) Secure data processing execution unit (communication terminal 20)
(2) Client application (communication terminal 20)
(3) Browser or service providing server application (communication terminal 20)
(4) Service providing server 30
(5) Management server 40

Note that any of the secure data process execution unit, the client application, and the browser is a function of the communication terminal 20.

The secure data process execution unit is, for example, the secure element of embedded type (eSE) or the UCII illustrated with reference to FIG. 2 and the like and is hardware that has a secure memory to store service data and a memory access function to execute access (data write or read) to the secure memory. In the case of service for which no secure memory area is necessary, the secure data process execution unit is hardware or software that executes a process to access a memory area of a memory of embedded type or a memory of removable type.

The client application is an application configured to mediate communications between a management server and a communication terminal or manage access to the secure data process execution unit.

In addition, a configuration may be such that the browser is replaced by an application on the side of the service providing server.

Processing of each step will be sequentially described hereinafter:

(Step S101)

First, in step S101, using a browser function, a user of the communication terminal 20 displays a Web page provided by the service providing server 30 on a display unit of the communication terminal 20. Following display items on the Web page, the user further makes a process request for a process to acquire or use service data such as a coupon, for example. Requested data is received by the service providing server 30.

(Step 102)

Then, in step S102, the service providing server 30 communicates with the management server 40 and notifies the management server 40 that the service providing server 30 has received the process request from the client, more specifically, the communication terminal 20. Then, the service providing server 30 notifies specific contents related to the request, as listed below.

(1) "Request mode information" on whether the request is a request for a process to write data to the communication terminal 20 or a request for a process to read data from the communication terminal 20;

(2) "Data to write" when the request is the write process request;

(3) "System identification information" to identify a system of the communication terminal 20, such as user agent information, and the like; and (4) Process target memory and order of priority information.

Note that since a method for starting a client application varies depending on an OS, notification of (3) "System identification information" to the management server is necessary. For example, a browser transmits a user agent character string to a server which accesses by using a browser function. The character string indicates a browser in use, a version number of the browser, details of a system (operating system and a version of the operating system and the like). In general, a Web server uses the information to provide contents optimized for the browser.

Here, user agent information is conveyed as information for identifying an OS, for example. The management server 40 may hold data on a correspondence relation between the user agent information and the OS information and judge an OS mounted in the client (communication terminal 20) based on the data.

(4) Process target memory and order of priority is information on priority order of usage of memory areas. Specifically, if a terminal has two secure data process execution units (secure elements) of eSE and UICC, the information is on which of the eSE and the UICC takes precedence or whether or not a process is executed on both, and the like.

Furthermore, the information is information on a process mode and the like that is to be executed when a terminal has no secure data process execution unit (secure element). Specifically, the information is data to instruct transmission of service data such as a two-dimensional barcode to an insecure memory area or stop of a process to provide service data, and the like.

Note that a configuration may also be such that this (4) Process target memory and order of priority is registered by a service provider or by service in advance in the management server 40.

(Step 103)

Then, the management server 40 generates a session in step S103. Session information is notified to the client application of the communication terminal 20 via the service providing server 30.

As a result of this, a session is shared by the management server 40, the service providing server 30, and the client application of the communication terminal 20.

(Step S104)

Then, in step S104, the management server 40 notifies the service providing server 30 of start information of the client application selected corresponding to an OS of the communication terminal 20.

(Step 105)

Then, in step S105, the service providing server 30 outputs start information for a client start app, for example, outputs a start page, to the browser of the communication terminal 20. In addition, when the communication terminal 20 is running a service providing server application, and not the browser, the service providing server 30 outputs a start command for the client app to the service providing server application.

(Step 106)

Then, in step S106, the communication terminal 20 starts the client application (program). Note that the client application may be up at all times and reside in the system. In that case, the communication terminal 20 gives an instruction to call the client application in step S105, and calls the client application in step S106.

(Step S107)

Then, in step S107, the client application is executed to acquire information on a system configuration of the communication terminal 20, specifically, communication terminal information such as an OS type, a secure element type (eSE, UICC, and the like), storage information of a secure memory, and the like.

(Step S108)

Then, in step 108, the client application of the communication terminal 20 notifies a server 49 of the communication terminal information acquired in step S107 such as the OS type, the secure element type (eSE, UICC, and the like), the storage information of a secure memory, and the like.

(Step S109)

Based on the communication terminal information received from the communication terminal 20 in step S108, the management server 40 generates a process command to execute a process corresponding to the process request from the communication terminal 20 which is notified by the service providing server 30 in step S102.

The process command is generated based on the communication terminal information of the communication terminal 20, specifically, the OS type, the secure element type (eSE, UICC, and the like), the storage information of a secure memory, and the like.

Furthermore, the process command is generated as a process command to execute a process corresponding to the process request from the communication terminal 20 which is notified by the service providing server 30 in step S102.

More specifically, the management server 40 generates a command conforming to a request and a configuration of a wireless communication terminal.

In addition, when it is known from step S107 and step S108 that the communication terminal 20 is a terminal that has no secure data process execution 26 unit (secure element), the management server 40 executes a process corresponding to the process mode information. The process mode information may be transmitted from the service providing server 30 in S102 or may be held in advance by the management server 40. For example, if the process mode information specifies a process to transmit service data such as a two-dimensional barcode and the like to an insecure memory area, the management server 40 generates the service data such as the two-dimensional barcode and the like that is to be recorded in a memory area of the communication terminal 20.

(Step S110)

Then, the management server 40 transmits the command or the service data generated in step S109 to the client app of the communication terminal 20.

(Step S111)

The client app of the communication terminal 20 executes the command received from the management server 40 or a process on the service data.

The command is a command generated based on the communication terminal information of the communication terminal 20, specifically, the OS type, the secure element type (eSE, UICC, and the like), the storage information of a secure memory, and the like.

Furthermore, the command is a command to execute the process requested by the communication terminal 20 for the service providing server 30 in step S101.

Specifically, a process to write or read service data such as a coupon, for example, to or from the secure memory in the eSE or the UICC in the communication terminal 20 is executed.

(Step 112)

Then, in step S112, the client application of the communication terminal 20 notifies the management server 40 of an execution process result of the command received from the management server 40 in step 112. In step S112, when the management server 40 receives a notice that a device process in the communication terminal 20 has failed in step S111, the management server 40 may generate different service data again to transmit the service data to the communication terminal 20. For example, in step S112, when the management server 40 is notified that in step S111, the communication terminal 20 has failed to write the service data to the secure element of embedded type and/or the secure element of removable type, the management server 40 generates service data (two-dimensional barcode, for example) to be recorded in an insecure memory area to transmit the service data to the communication terminal 20. Note that service data stored in advance may be transmitted to the communication terminal 20 as the service data to be recorded in the insecure memory area.

(Step S113)

The management server 40 that receives the notice of the command processing result instructs the client application to end the processing in step S113.

(Step S114)

The client application that receives the process end notice from the management server 40 returns to the browser in step S114 and ends execution of the client application. Note that the client application returns to the service providing server application when a process utilizing the service providing server application which is not the browser is executed.

(Step S115)

In step S115, the browser (or the service providing server application) of the communication terminal 20 notifies the service providing server 30 that the processing according to the command is complete.

(Step S116)

In step S116, the service providing server 30 requests of the management server 40 the execution process result of the command in the communication terminal.

(Step S117)

In step S117, the management server 40 transmits to the service providing server 30 the execution process result of the command received from the communication terminal.

(Step S18)

In step S118, the service providing server 30 notifies the browser or the service providing server application running in the communication terminal 20 that all processing has ended.

As described above, in the sequence diagrams illustrated in FIG. 5 and FIG. 6, the service providing server 30 does not have to execute a process to analyze a type of the secure data process execution unit such as a configuration of the communication terminal 20, more specifically, an OS type or whether or not the communication terminal 20 has the eSE or the UICC, and the like.

In the sequence diagrams illustrated in FIG. 5 and FIG. 6, a kind (type) or a function of the secure data process execution unit is determined by a program (application) run by the client application. The client application has only to follow result of the determination to receive and execute a command generated by the management server 40.

The command being executed, a correct process corresponding to a configuration of the communication terminal 20 is executed.

More specifically, a process to record or read service data such as a coupon, for example, to or from a secure memory may be executed according to a correct algorithm that corresponds to a configuration of the wireless communication terminal 20.

In this manner, the processing following the sequence illustrated in FIG. and FIG. 6 enables reliable execution of processing according to an algorithm corresponding to a type of the secure data process execution unit. Thus, the service providing server 30 does not have to execute a process to determine a function of the communication terminal 20 and the like, which alleviates a processing burden.

Figure 7:
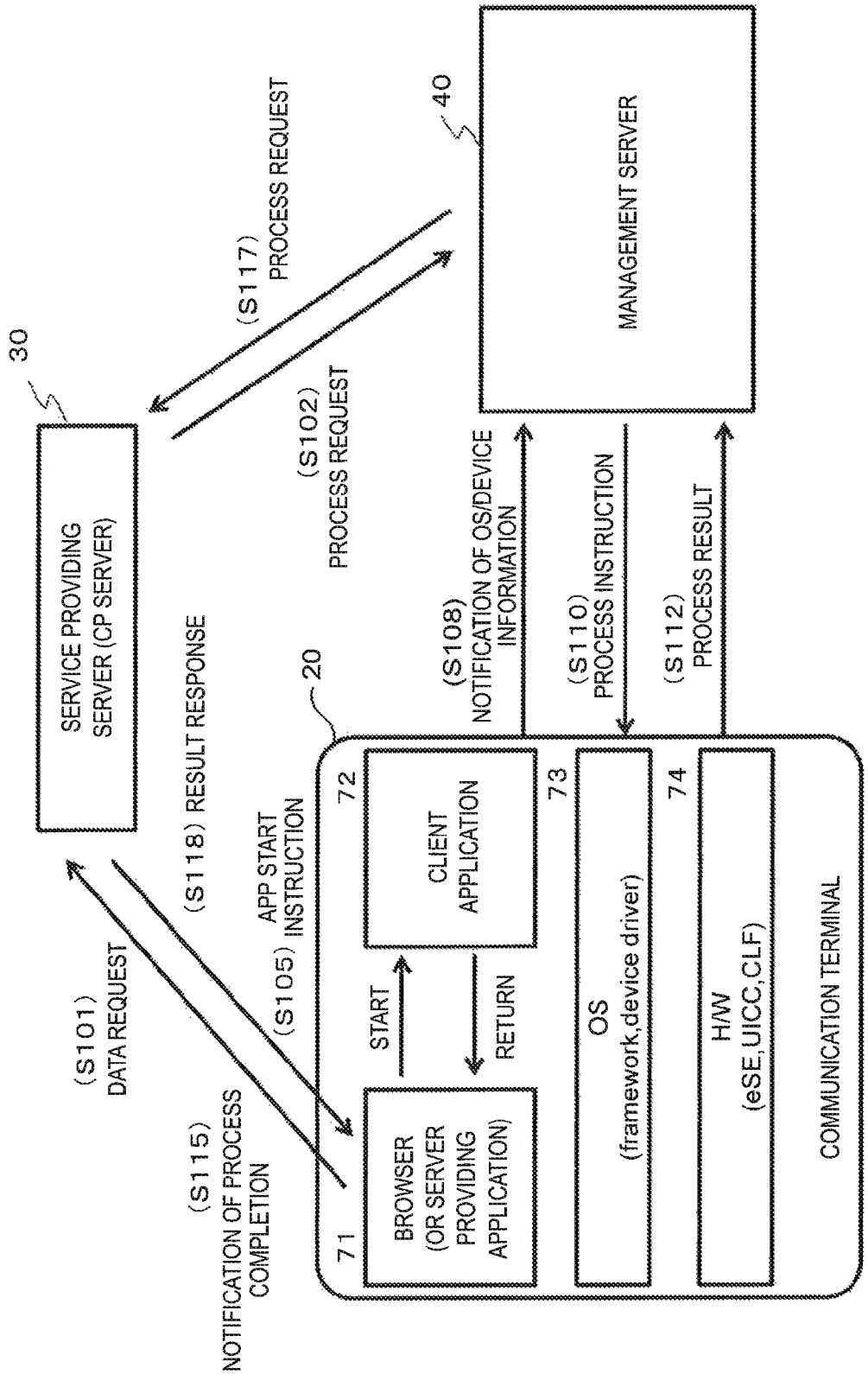
FIG. 7 is a view illustrating a sequence of a process to acquire configuration information of a communication terminal and a process to execute a command corresponding to a system configuration of the communication terminal.

FIG. 7 clearly indicates the sequence illustrated with reference to FIG. 5 and FIG. 6 by a communication process among three parties of the communication terminal 20, the service providing server 30, and the management server 40.

As is seen from the figure, communications performed between the service providing server 30 and the communication terminal 20 are only communications as shown below:

(Step S101) A process request from the communication terminal 20 to the service providing server 30

(Step S105) An app start instruction from the service providing server 30 to the communication terminal 20

(Step S115) The process completion notice from the communication terminal 20 to the service providing server 30

(Step S118) A response of the command process result from the service providing server 30 to the communication terminal 20

The communications performed between the service providing server 30 and the communication terminal 20 are only the communications shown above. The service providing server 30 does not have to execute a process to determine a function of the communication terminal 20 and the like, which alleviates a processing burden. Note that the app start instruction to the communication terminal 20 in step S105 may be directly given by the management server 40 to the communication terminal 20.

<4. Regarding a Hardware Configuration Example of a Communication Terminal>

Next, a configuration example of the communication terminal 20 will be described with reference to FIG. 8.

Figure 8:
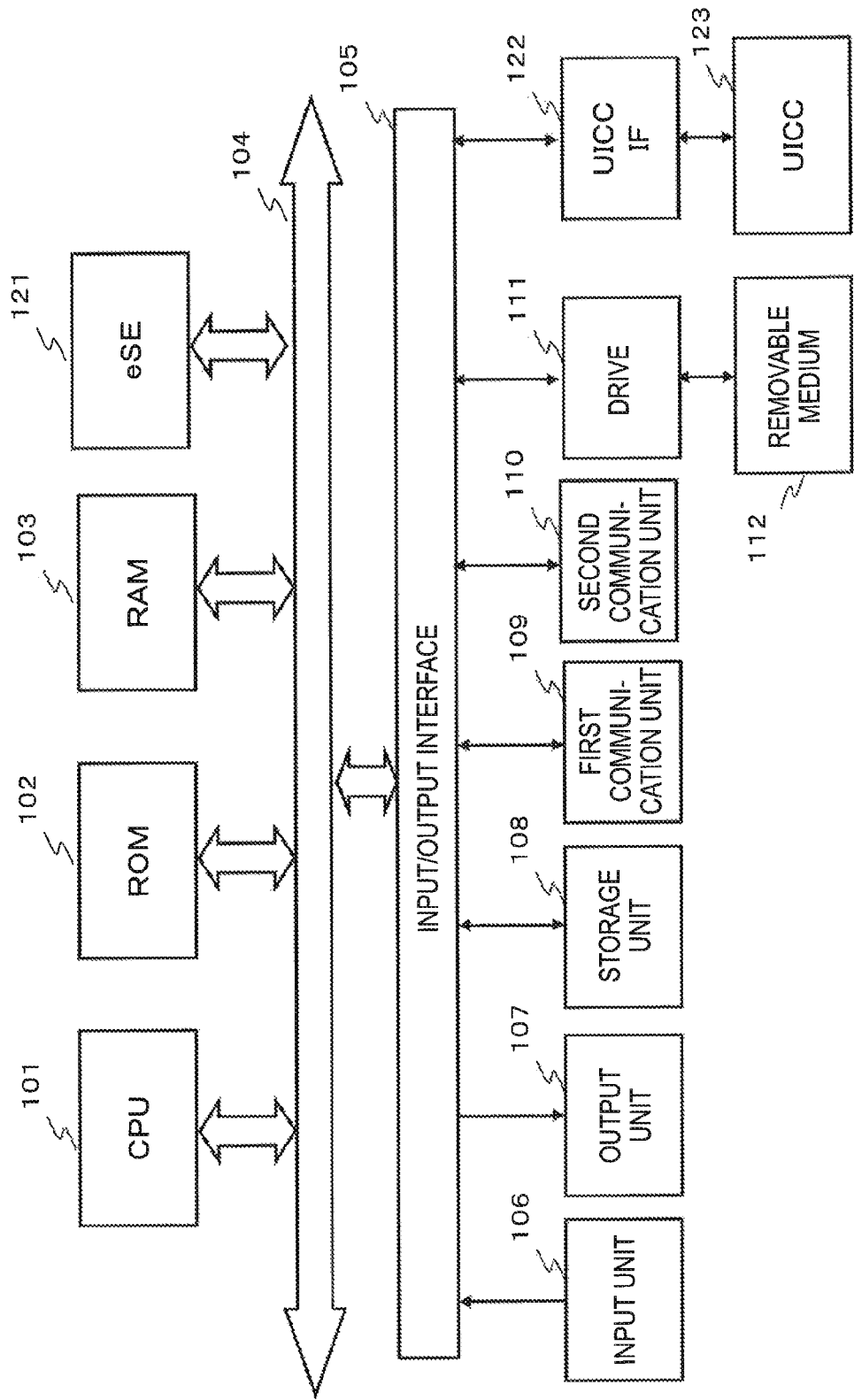
FIG. 8 is a view illustrating a hardware configuration example of the communication terminal 20.

In FIG. 8, a CPU (central processing unit) 101 functions as a data processing unit configured to execute various types of processes according to a program stored in a ROM (read only memory) 102 or a program loaded to a RAM (random access memory) 103. The RAM 103 is also utilized as a work area which temporarily stores data necessary for the CPU 101 to execute various processes.

In FIG. 8, the CPU 101, the ROM 102, the RAM 103, and a secure element of embedded type (eSE) 121 are interconnected via a bus 104. Note that as illustrated in FIG. 2, the secure element of embedded type (eSE) 121 and a secure element of removable type (UICC) are generally connected with the CLF 52 without going through the bus. The memory of embedded memory may be in the control unit 55 or may be a memory to be connected via the bus 104. In addition, when the memory of removable type is a memory card, the memory of removable type may be connected via the bus 104.

The secure element of embedded type (eSE) 121 is an IC chip that has a secure memory as a data storage unit and an execution unit to control access to the secure memory. The secure memory is a memory area which is accessible only when an access process is executed according to an algorithm run by a specific program (application).

An input/output interface 105 is also connected to the bus 104.

To the input/output interface 105 are connected an input unit 106 including a key, a button, a touch panel, and a microphone and the like, an output unit 107 which has a display including a liquid crystal display (LCD) or an organic electro-luminescence (EL) and the like and a speaker and the like, a storage unit 108 including a hard disk and the like, a first communication unit 109 including an antenna and the like configured to perform wireless communications, and a second communication unit 110 including an antenna and the like configured to perform proximity communications.

Terminal information of the communication terminal 20 and the like such as information specific to the terminal device 20, data acquired externally, various types of process programs, parameters, and the like are stored in the storage unit 108.

The first communication unit 109 performs a wireless communication process with a base station, while the second communication unit 110 performs a proximity communication process with a reader/writer.

In addition, a drive 111 is connected to the input/output interface 105 which is such configured that removable medium 112 such as a semiconductor memory and the like are mountable.

In addition, the input/output interface 105 has such a configuration that a UICC 123 is mountable via a UICC interface 122.

The UICC 123 is an IC card that has a secure memory as a data storage unit and an execution unit to control access to the secure memory. The secure memory is a memory area which is accessible only when an access process is executed according to an algorithm run by a specific program (application).

Note that the input/output interface 105 does not necessarily have a connection interface with all of the hardware and may also include a plurality of input/output interfaces.

<5. Regarding a Hardware Configuration Example of a Management Server>

Next, a configuration example of the management server 40 is described with reference to FIG. 9.

In FIG. 9, a CPU 201 functions as a data processing unit configured to execute various types of processes according to a program stored in a ROM 202 or a program loaded to a RAM 203. Data necessary for the CPU 201 to execute various types of processes is stored in the RAM 203, as appropriate.

The CPU 201, the ROM 202, and the RAM 203 are interconnected via a bus 204. An input/output interface 205 is also connected to the bus 204.

To the input/output interface 205 are connected an input unit 206 including a keyboard, a mouse and the like, an output unit 207 including a display and a speaker and the like, a storage unit 208 including a hard disk and the like, and a communication unit 209 including a modem, a terminal adaptor and the like.

The communication unit 209 executes a communication process via a network such as Internet.

To the input/output interface 205 is also connected a drive 210, as necessary, to which the removable media including a magnetic disk, an optical disk, a magneto-optical disk, or a semiconductor memory and the like are mounted as appropriate, and a computer program read from the removable medium 211 is installed in the storage unit 208, as appropriate.

Note that the input/output interface 205 does not necessarily have a connection interface with all the hardware and may also include a plurality of input/output interfaces.

Note that a description of a configuration of the service providing server 30 is omitted since the configuration is similar to the configuration of the management server 40 which is illustrated with reference to FIG. 9.

[6. Conclusion of Constitution of Present Disclosure]

So far, the embodiment of the present disclosure has been described in detail with reference to a specific embodiment. However, it should be noted that various variations and alternative embodiments will become apparent to those skilled in the art without departing from the scope of the present disclosure. That is, it should be noted that the present disclosure is disclosed through embodiments and is not construed in a manner limited by these embodiments. In order to determine the scope of the present disclosure, it is necessary to consider the scope of the claims.

Additionally, the present technology may also be configured as below.

(1) A management server including:
a communication unit configured to communicate with a communication terminal that utilizes a service; and
a data processing unit,
wherein the data processing unit is configured to
receive, from the communication terminal, system configuration information including a memory system configuration of the communication terminal,
determine, in accordance with the system configuration information, a memory area in the communication terminal where service data for the communication terminal to utilize the service is recorded or a memory area in the communication terminal from which the service data is read,
generate a command to execute a process to access the memory area or service data to be recorded in the memory area, and
transmit the command or the service data to the communication terminal via the communication unit.

(2) The management server according to (1), wherein the data processing unit has priority order information indicating a memory area processing on which takes precedence when the communication terminal has a plurality of process target memory areas, and is configured to make the determination based on the system configuration information and the priority order information.

(3) The management server according to (2), wherein
the communication unit further communicates with a service providing server related to the service, and
the data processing unit acquires the priority order information from the service providing server via the communication unit.

(4) The management server according to (2) or (3), wherein
the memory system configuration is a system configuration of a secure element of embedded type and/or a secure element of removable type, and
the priority order information indicates a priority order of an access process to the secure element of embedded type and/or the secure element of removable type.

(5) The management server according to (4), wherein the priority order information indicates that the access process is executed on both secure elements when the communication terminal has both the secure element of embedded type and the secure element of removable type.

(6) The management server according to any one of (1) to (5), wherein
the memory system configuration is a system configuration including presence or absence of a secure element, and
the data processing unit creates service data to be recorded in an insecure memory area when the communication terminal has no secure element, and transmits the service data to the communication terminal via the communication unit.

(7) The management server according to (6), wherein the service data to be recorded in the insecure memory area is a two-dimensional barcode.

(8) The management server according to any one of (1) to (7), wherein
the communication unit is further configured to communicate with the service providing server related to the service, and
the data processing unit is configured to acquire from the service providing server, via the communication unit, request mode information which indicates content of a process that the communication terminal requests of the service providing server, and generate the command or the service data based on the request mode information and the system configuration information.

(9) A data processing method including:
acquiring system configuration information including a memory system configuration of a communication terminal and transmitting the system configuration information to a management server,
receiving a command to execute a process to access a memory area in the communication terminal based on the system configuration information; and
causing the command to be executed on the memory area in the communication terminal.

(10) The data processing method according to (9), wherein the memory system configuration is a system configuration of a secure element of embedded type and a secure element of removable type.

(11) A program for causing data processing to be executed in a communication terminal,
wherein the communication terminal has
a communication unit,
a storage unit configured to store data received through the communication unit, and
a data processing unit configured to execute a data record process or a data read process on the storage unit,
wherein the program causes the data processing unit to
acquire system configuration information of the communication terminal including a memory system configuration of a secure memory included as the storage unit,
transmit the system configuration information to outside of the communication terminal via the communication unit, and
execute a command, received via the communication unit, to execute a process to access the secure memory from the outside of the communication terminal.

(12) The program according to (11), wherein the memory system configuration is a system configuration of a secure element of embedded type and a secure element of removable type.

Furthermore, the processing sequence that is explained in the specification can be implemented by hardware, by software and by a configuration that combines hardware and software. In a case where the processing is implemented by software, it is possible to install in memory within a computer that is incorporated into dedicated hardware a program in which the processing sequence is encoded and to execute the program. It is also possible to install a program in a general-purpose computer that is capable of performing various types of processing and to execute the program. For example, the program can be installed in advance in a storage medium. In addition to being installed in a computer from the storage medium, the program can also be received through a network, such as a local area network (LAN) or the Internet, and can be installed in a storage medium such as a hard disk or the like that is built into the computer.

Note that the various types of processing that are described in this specification may not only be performed in a temporal sequence as has been described, but may also be performed in parallel or individually, in accordance with the processing capacity of the device that performs the processing or as necessary. Furthermore, the system in this specification is not limited to being a configuration that logically aggregates a plurality of devices, all of which are contained within the same housing.

As described above, according to the configuration of an embodiment of the present disclosure, a configuration is implemented that can provide a user's communication terminal with service data necessary for utilization of services without increasing load of a service providing server on communication terminals with different system configurations. In addition, the service data necessary for utilization of services can also be read from the user's communication terminal.

Specifically, the user's communication terminal acquires terminal configuration information necessary for access to a memory area in the communication terminal, according to a program that is started corresponding to app start information provided by the service providing server or a management server. The user's communication terminal further transmits the acquired configuration information to the management server. The management server generates a command or service data for memory access corresponding to the system configuration information of the communication terminal and transmits the command or the service data to the communication terminal. The communication terminal executes a process on the command or the service data received from the management server to access the memory area and execute a process to record or read data.

The configuration implements a configuration that enables communication terminals with different system configurations to execute an access process to a memory area without increasing load on a service providing server.

What is claimed is:
1. A management server comprising:
a communication unit configured to communicate with a communication terminal that utilizes a service; and
a data processing unit,
wherein the data processing unit is configured to
receive, from the communication terminal, system configuration information including a memory system configuration of the communication terminal,
determine, in accordance with the system configuration information, a memory area in the communication terminal where service data for utilizing the service can be recorded or a memory area in the communication terminal from which the service data can be read,
generate a command in accordance with the system configuration information to execute a process to access the memory area where the service data is recorded or service data in accordance with the system configuration information to be recorded in the memory area, and
transmit the command or the service data, in accordance with the system configuration information, to the communication terminal via the communication unit to be executed,
wherein the memory system configuration is a system configuration of a secure element of embedded type and/or a secure element of removable type,
wherein the data processing unit has priority order information indicating a memory area processing on which takes precedence when the communication terminal has a plurality of process target memory areas, and is configured to make the determination based on the system configuration information and the priority order information, and
wherein the communication unit and the data processing unit are each implemented via at least one processor.

2. The management server according to claim 1, wherein the communication unit further communicates with a service providing server related to the service, and
the data processing unit acquires the priority order information from the service providing server via the communication unit.

3. The management server according to claim 1, wherein the priority order information indicates a priority order of an access process to the secure element of embedded type and/or the secure element of removable type.

4. The management server according to claim 3, wherein the priority order information indicates that the access process is executed on both secure elements when the communication terminal has both the secure element of embedded type and the secure element of removable type.

5. The management server according to claim 1, wherein the memory system configuration is a system configuration including presence or absence of a secure element, and the data processing unit creates service data to be recorded in an insecure memory area when the communication terminal has no secure element, and transmits the service data to the communication terminal via the communication unit.

6. The management server according to claim 5, wherein the service data to be recorded in the insecure memory area is a two-dimensional barcode.

7. The management server according to claim 1, wherein the communication unit is further configured to communicate with the service providing server related to the service, and the data processing unit is configured to acquire from the service providing server, via the communication unit, request mode information which indicates content of a process that the communication terminal requests of the service providing server, and generate the command or the service data based on the request mode information and the system configuration information.

8. A data processing method, the method being executed via at least one processor, and comprising:

acquiring system configuration information including a memory system configuration of a communication terminal and transmitting the system configuration information to a management server;

receiving a command to execute a process to access a memory area in the communication terminal based on the system configuration information; and causing the command, in accordance with the system configuration information, to be executed on the memory area in the communication terminal, wherein the memory system configuration is a system configuration of a secure element of embedded type and/or a secure element of removable type, and wherein the system configuration information has priority order information indicating a memory area processing on which takes precedence when the communication terminal has a plurality of process target memory areas, and is configured to make the determination based on the system configuration information and the priority order information.

9. The data processing method according to claim 8, wherein the memory system configuration is a system configuration of a secure element of embedded type and a secure element of removable type.

10. A non-transitory computer-readable storage medium having stored thereon a program, which when executed by a computer causes the computer to execute a method, the method comprising:

a communication terminal,
   wherein the communication terminal has
      a communication unit,
      a storage unit configured to store data received through the communication unit, and
      a data processing unit configured to execute a data record process or a data read process on the storage unit,
   wherein the program causes the data processing unit to
      acquire system configuration information of the communication terminal including a memory system configuration of a secure memory included as the storage unit,
      transmit the system configuration information to outside of the communication terminal via the communication unit, and
      execute a command, accordance with the system configuration information, received via the communication unit, to execute a process to access the secure memory from the outside of the communication terminal,
   wherein the memory system configuration is a system configuration of a secure element of embedded type and/or a secure element of removable type, and
   wherein the data processing unit has priority order information indicating a memory area processing on which takes precedence when the communication terminal has a plurality of process target memory areas, and is configured to make the determination based on the system configuration information and the priority order information.

11. The program according to claim 10, wherein the memory system configuration is a system configuration of a secure element of embedded type and a secure element of removable type.

* * * * *